United States Patent [19]

Molnar

[11] Patent Number: 5,241,863
[45] Date of Patent: Sep. 7, 1993

[54] BUFFER VOLUME
[75] Inventor: Antal Molnar, Finspong, Sweden
[73] Assignee: ABB Stal AB, Finspong, Sweden
[21] Appl. No.: 778,834
[22] PCT Filed: Jun. 5, 1990
[86] PCT No.: PCT/SE90/00386
   § 371 Date: Dec. 23, 1991
   § 102(e) Date: Dec. 23, 1991
[87] PCT Pub. No.: WO91/00505
   PCT Pub. Date: Jan. 10, 1991
[30] Foreign Application Priority Data
   Jun. 26, 1989 [SE] Sweden .................... 8902300
[51] Int. Cl.⁵ .................................. G01L 7/00
[52] U.S. Cl. ............................. 73/706; 73/756
[58] Field of Search ......... 73/706, 714, 756, 23.33, 73/38, 707, 726, 727

[56] References Cited
U.S. PATENT DOCUMENTS
3,295,374 1/1967 Sawada et al. ................... 73/706

*Primary Examiner*—Donald O. Woodiel
*Attorney, Agent, or Firm*—Pollock, Vande Sande & Priddy

[57] ABSTRACT

Apparatus for measuring the pressure within a fluid-conveying member of a mixture of a fluid and particulate solids comprises an outlet port in the fluid-conveying member, a buffer vessel having walls defining a buffer volume for containing a buffer medium, the buffer vessel having first and second end portions, and having a measuring outlet at the first end portion being in fluid communication with the outlet port of the fluid-conveying member. An impulse conduit has its first end in fluid communication with the second end portion of the buffer vessel and a fluid pressure measuring device is in fluid communication with the second end of the impulse conduit. A source of purging medium is in fluid communication with the second end portion of the buffer vessel. The flow of the purging medium is controlled to establish a back pressure in the buffer vessel sufficient to prevent particulate solids which flow into the buffer vessel from the fluid-conveying member from reaching the impulse conduit.

9 Claims, 2 Drawing Sheets

BUFFER VOLUME

FIELD OF THE INVENTION

The present invention relates to a device for pressure measurement in a container or a conveying pipe conveying pressure medium mixed with solid, particulate material. More particularly, this invention relates to a device for preventing solid material from penetrating into and blocking, or otherwise causing disturbance of, the impulse conduit used in the measuring device. The invention is particularly valuable when measuring is performed in containers or processes where a considerable purging flow cannot be allowed for reasons of measurement or process technique. This is the case, for example, in conveying pipes where a pressure medium transports a solid, particulate material at great velocity and where a large purging flow out of the measurement outlet may cause disturbance of the flow in the pipe with a resultant increased erosion. From the point of view of measurement technique, it is often advantageous if the purging flow can be minimized.

BACKGROUND OF THE INVENTION

During pressure measurement in a container, normally a pressure gauge is connected to the container by means of a conduit, a so-called impulse conduit. The impulse conduit, through which the pressure is conveyed from the container to the pressure gauge, is often long and normally has a small inner cross section area. When the pressure medium, which may be in gaseous or liquid state, is mixed with solid material, for example dust or sludge, there is a constant risk that solid material enters the impulse conduit and remains there, resulting in clogging or other disturbance. The risk of this increases when there are pressure variations or pressure impulses in the container or if there is a leakage in the impulse conduit or the pressure gauge.

To prevent the risk of clogging, filters or traps are installed, which often function unsatisfactorily. This is particularly the case when the pressure medium is in great motion or has a high temperature. Another solution is continuous or regular flushing of the impulse conduit. In that connection a clean pressure medium is used, which may be supplied to the impulse conduit from a special system or, as in SE 8206195-3, from the same pressure source as the pressure medium in the container but taken out clean at a suitable location in the plant and supplied to the impulse conduit.

In the latter case the purging flow is determined by the pressure difference between that point where the clean pressure medium is taken out and the measuring point. In other cases the purging flow is maximized by measurement or process aspects. From the point of view of process technique, the disturbance from a purging flow may be sensitive, especially in conveying pipes where a particulate, solid material is transported at great speed. Too large inflows through the measuring outlet disturb the flow in the conveying pipe, resulting in greatly increased erosion on the conveying pipe.

Considering the limitations on the purging flow, conditioned by process or measurement aspects, the risk remains, using the state of the art, that solid material will enter the impulse conduit. This also means that the risk of clogging or disturbance of the measurement remains, especially in systems with great pressure variations or when leaks (even small ones) occur in the impulse conduit or the pressure gauge.

SUMMARY OF THE INVENTION

The present invention aims to improve the availability and reliability of the measurement equipment during pressure measurement in a container or a conveying pipe containing pressure medium mixed with fixed, particulate material. The invention eliminates, or at least minimizes, the risk of solid material penetrating into the impulse conduit in case of great pressure impulses in the container or the conveying pipe, and associated risks of clogging disturbance of the impulse conduit. According to the present invention, this is achieved by introducing a buffer volume between the measuring outlet and the impulse conduit. By the embodiment and dimensioning specified according to the invention, the buffer volume prevents the dust-laden medium from reaching the impulse conduit.

Upon a pressure increase in the container, dust-laden pressure medium is pressed into the buffer volume through the opening of the measuring outlet. However, since the opening for the purging fluid is placed adjacent to the opening of the impulse conduit in the opposite end of the buffer volume, a back pressure is created in the buffer volume which is equally great as that which is brought about by the pressure increase in the container, and because of the embodiment and dimensioning of the buffer volume, the dust-laden pressure medium never reaches the impulse conduit. Then, when the purging fluid again flows out through the measurement outlet, the dust is flushed out from the buffer volume.

To further minimize the risk of solid material penetrating into the impulse conduit, a partition or baffle, which screens off the orifices of the impulse conduit and the purging conduit from the measuring outlet, may be installed in the buffer volume.

The buffer volume is formed with a cross section area which is considerably greater than the area of the opening of the measuring outlet and also the cross section area of the impulse conduit, normally 10–1000 times, preferably 25–250 times, as great. The hole area of the opening of the measuring outlet is normally of the same order of magnitude as the cross section area of the impulse conduit, but the ratio between these areas may vary between 0.01 and 100.

The buffer volume is dimensioned in view of the inner volume of the impulse conduit, a suitable purging flow for the process, and the expected maximum pressure variations. The buffer volume increases with greater and more frequently occurring pressure impulses in the system as well as with increased impulse conduit volume. In order for dust-laden pressure medium not to enter the impulse conduit also in case of the heaviest pressure impulses that are expected, a requirement is that the relation between the buffer volume and the volume of the impulse conduit is equal to the relation between the inflow through the measuring outlet as a result of maximum expected pressure impulse in the system, the disturbance flow, and the purging flow multiplied by a dimensionless factor k:

buffer volume/impulse conduit volume=k
(disturbance flow/purging flow)

The dimensionless factor k varies between 0.1 and 1, preferably between 0.6 and 1, and is assumed in dependence on the length and inside diameter of the impulse conduit and on the nature of the disturbance. For impulse conduits with a low pressure drop, short and with relatively great inside diameter, $k=1$ and then approaches minimum when the pressure drop across the impulse conduit increases.

The embodiment and dimensioning of the buffer volume according to these criteria, besides resulting in dust-laden pressure medium being effectively prevented from reaching the impulse conduit, also result in the pressure difference between the measuring outlet and the impulse conduit, which may falsify the pressure measurement, becoming negligible.

BRIEF DESCRIPTION OF THE DRAWINGS

The invention is schematically shown in FIG. 1. The buffer volume, applied to pressure measurement in a conveying pipe, is clear from FIG. 2, whereas

DESCRIPTION OF THE PREFERRED EMBODIMENTS

Figure 1:
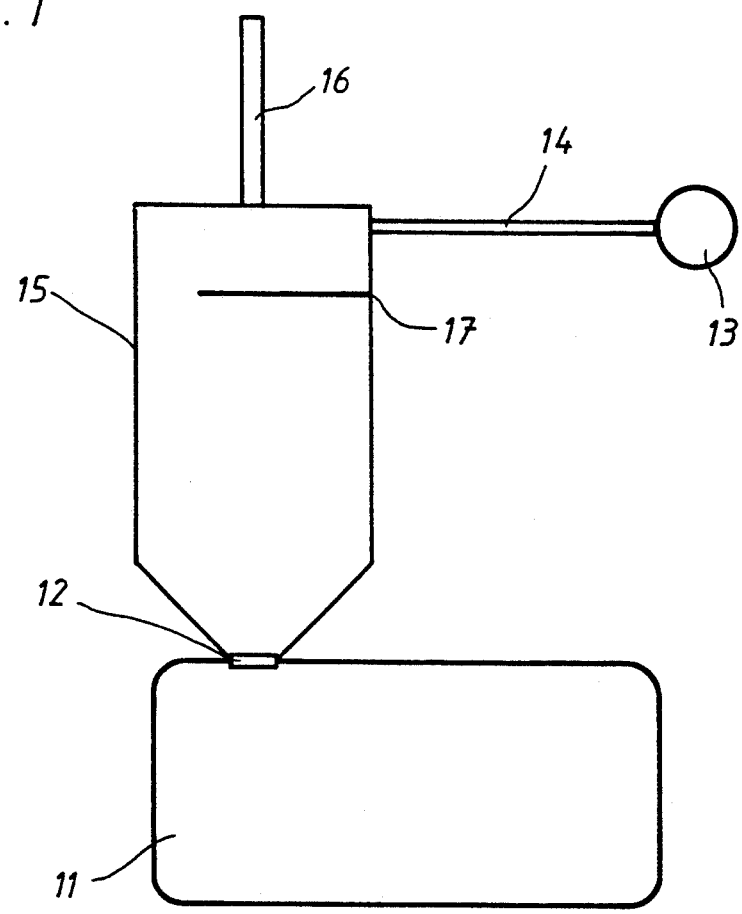

When measuring the pressure in a container 11, containing a pressure medium mixed with solid, particulate material, the pressure is conveyed from the measuring outlet 12 in the container 11 to the pressure gauge 13 through an impulse conduit 14. To prevent solid material from penetrating into the impulse conduit 14 upon pressure variations in the container 11, a buffer volume 15 is provided between the measuring outlet 12 and the impulse conduit 14.

The buffer volume 15 is formed with a cross section considerably greater than the inner cross section area of the impulse conduit 14 and the hole area of the measuring outlet 12 and is dimensioned in view of known factors such as the volume of the impulse conduit 14, the purging flow in through the conduit 16, maximum pressure variations in the container 11, any known leakage in the pressure gauge 13 or the impulse conduit 14, and the requirements for maximum pressure difference between the measuring outlet 12 and the impulse conduit 14.

The buffer volume 15 is supplied with clean pressure medium, purging fluid, through the conduit 16 which opens out near the impulse conduit 14 at one end of the buffer volume 15. The purging fluid flows past the orifice of the impulse conduit 14, fills the buffer volume 15, and flows out into the container 11 through the measuring outlet 12 which is located at the opposite end of the buffer volume 15 relative to the purging conduit 16 and the impulse conduit 14.

When the pressure increases in the container 11, dust-laden pressure medium flows through the measuring outlet 12 into the buffer volume 15, where it encounters the flowing purging fluid and creates a back pressure therein. The back pressure is conveyed by the clean medium, through the impulse conduit 14, to the pressure gauge 13 and the dust-laden pressure medium from the container 11 never reaches the impulse conduit 14. The dust which has entered the buffer volume 15 is then flushed, with the purging fluid supplied to the buffer volume 15 through the conduit 16, out through the measuring outlet 12.

In order to make it even more difficult for solid material to penetrate into the impulse conduit 14, a screen or baffle 17 may be mounted in the buffer volume 15 so that it screens off the orifices of the impulse conduit 14 and the purging conduit from the measuring outlet 12.

Figure 2:
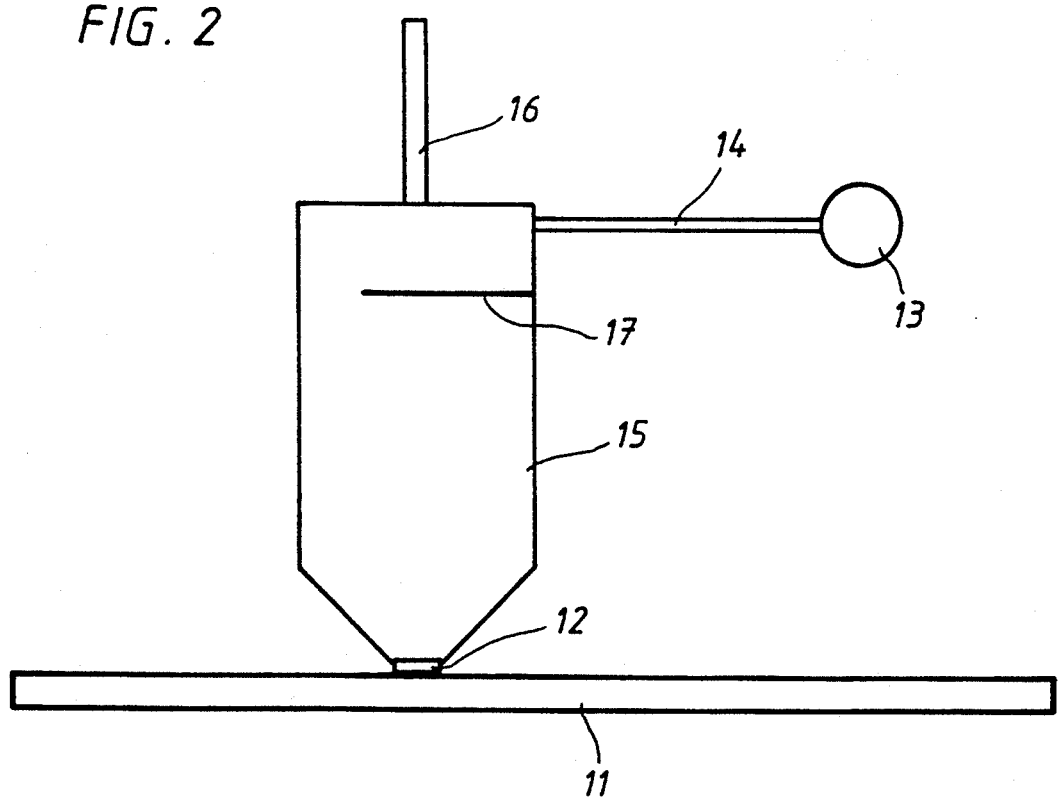

If the present invention, as shown in FIG. 2, is applied to pressure measurement in a conveying pipe 11, it is important that the purging flow out through the measuring outlet 12 is not so great that the flow configuration is disturbed in the conveying pipe 11. A disturbance will easily result in the solid, particulate material, transported at high speed by the pressure medium, being thrown against the wall of the pipe 11, which greatly increases the erosion. For that reason it is desired to minimize the purging flow, which can be accomplishd by introducing a buffer volume 15 between the measuring outlet 12 on the conveying pipe 11 and the impulse conduit 14 without increasing the risks of clogging of the impulse conduit 14. The buffer volume 15 is designed as in the general case but with particular emphasis on minimizing the purging flow out into the conveying pipe 11 and on making possible recording with the pressure gauge 13 of even fast pressure impulses in the conveying pipe 11. By mounting a baffle 17 in the buffer volume 15 so that the orifices of the impulse conduit 14 and the purging conduit 16 are screened off from the measuring outlet 12, the risks of clogging are further reduced.

Figure 3:
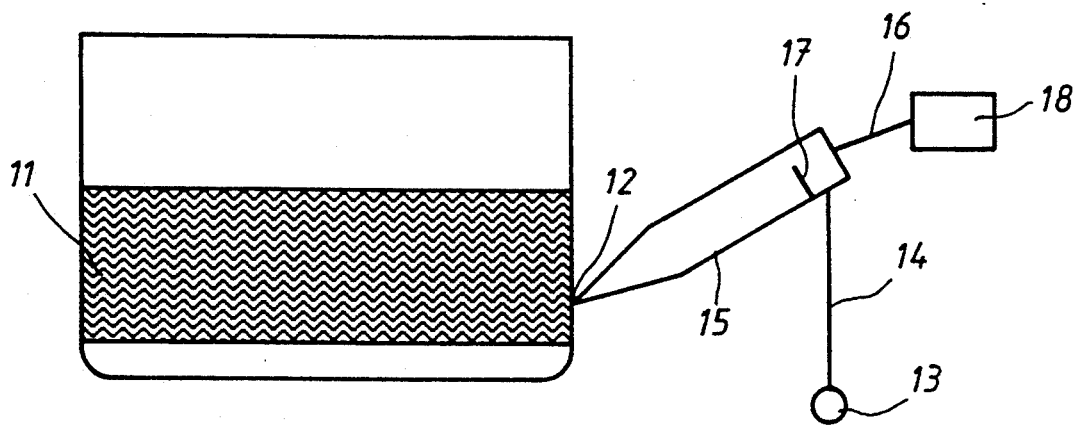
FIG. 3 and FIG. 4 show how the invention may be utilized for pressure measurement in a fluidized bed, an atmospheric bed and a pressurized bed, respectively.
Figure 4:
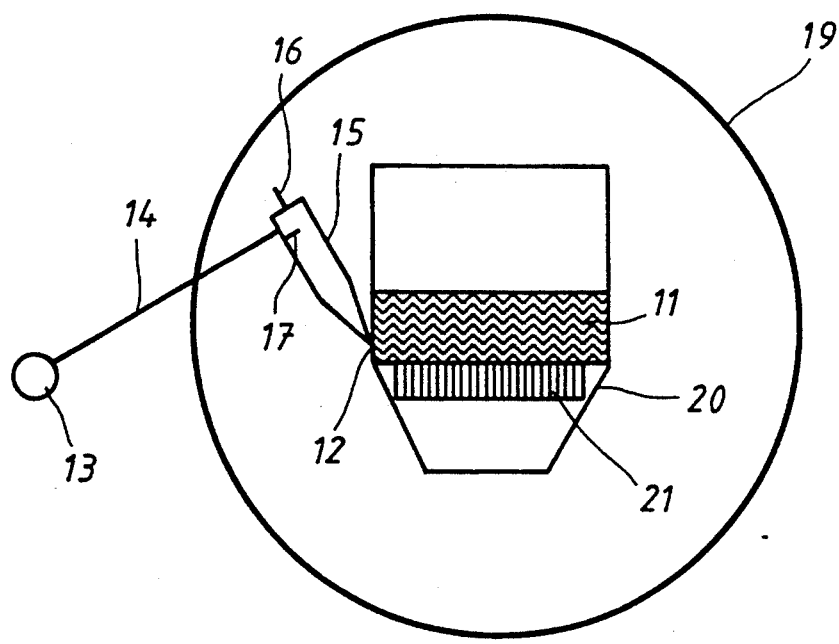

In case of pressure measurement in a fluidized bed 11, the process seldom reaquires that the purging flow should be minimized; instead the purging flow is often determined by measurement aspects. If the clean gas for the purging is taken out from the same pressure source 19 as that which supplies fluidization gas to the bed 11, the purging flow is determined by the pressure drop between that point where the clean gas is taken out and the measuring point 12. Also in this case the buffer volume 15 is designed according to the general case with particular emphasis on creating the necessary conditions, as far as measuring sensitivity and recording of fast pressure variations are concerned, for making possible a good supervision of the bed 11. As shown in FIGS. 3 and 4, the buffer volume is applicable to pressure measurement on both atmospheric and pressurized fluidized beds.

FIG. 3 shows the application of the buffer volume 15 to pressure measurement on a fluidized bed 11. The measurement is performed in the bed 11 at the measuring outlet 12 and the pressure is conveyed to the pressure gauge 13 through the impulse conduit 14. To prevent bed material from penetrating into and blocking the impulse conduit 14, a buffer volume 15 is arranged, possibly completed with a baffle 17, between the measuring outlet 12 and the impulse conduit 14.

The buffer volume 15 is formed, as in the general case, with a cross section area considerably larger than the cross section area of the impulse conduit 14 and the opening of the measuring outlet 12. The gas for purging the buffer volume 15 is, in FIG. 3, taken from a separate source 18 but may just as well be taken from the fluidization gas before this is supplied to the bed 11.

In a plant for combustion in a pressurized fluidized bed, a PFBC plant, the invention may be utilized for pressure measurement of dust-laden gas at a plurality of locations, in conveying pipes for the supply of crushed fuel or bed material to the bed, in ash discharge conduits, in flue gas channels and cyclones and, as is illustrated in FIG. 4, in the bed.

In a PFBC plant the combustion takes place in a fluidized bed 11 with particulate bed material contained in a bed vessel 20 which is surrounded by a pressure vessel 19. Gas is supplied to the bed 11 from the pressure vessel 19 by way of the inlet members 21 in the lower part of the bed vessel 20.

During pressure measurement in the bed 11, in order to prevent dust-laden gas from the bed 11 from penetrating into the impulse conduit 14, which conveys the pressure to the pressure gauge 13, a buffer volume 15 is arranged, possibly completed with a baffle 17, between the measuring outlet 12 and the impulse conduit 14. According to FIG. 4, the buffer volume 15 is purged with clean gas which is taken out into the pressure vessel 19 from which also the bed 11 is supplied with gas. However, as in FIG. 3, the buffer volume 15 could also have been purged with gas from a separate pressure source 18.

DIMENSIONING EXAMPLES

The dimensioning of the buffer volumes in a few systems will be described in the following.

EXAMPLE 1

Dimensioning of the buffer volume for pressure measurement in a container with a process pressure of 0.105 MPa and with a temperature of 90° C.; maximum disturbance is a pressure shock of 100 Pa/s. For transfer to the pressure gauge 13, an impulse conduit with a length of 12 meters and with an inside diameter of 1.5 mm is provided. A purging gas of a pressure of 0.12 MPa and with a temperature of 20° C. is led to the buffer volume in a conduit with the inside diameter 0.5 mm.
I. First, the purging flow is calculated, which becomes $2.3 \times 10^{-5}$ kg/s.
II. Then, the measuring outlet is dimensioned with the criterium that clean purging gas is to flow out into the container at a speed of 4–10 m/s. A hole diameter of 2.0 mm on the measuring outlet gives 6 m/s.
III. Assuming a hole diameter of 2 mm, the pressure drop across the measuring outlet is 61.5 Pa.
IV. The volume of the impulse conduit is $2.2 \times 10^{-5}$ m$^3$.
V. Maximum disturbance gives rise to a disturbance flow in through the measuring outlet of $3.0 \times 10^{-5}$ kg/s.
VI. Assuming that $k=0.6$, the buffer volume will be $1.6 \times 10^{-5}$ m$^3$, which with a diameter of 20 mm gives a length of 52 mm.
$k=0.6$ and an inside diameter of the buffer volume of 20 mm result in the cross section area ratio between the buffer volume and the impulse conduit being $400/2.25=178$; the ratio between the cross section area of the buffer volume and the hole area of the measuring outlet being $400/4=100$; and the ratio between the hole area of the measuring outlet and the cross section area of the impulse conduit being $4/2.25=1.8$.

EXAMPLE 2

Dimensioning of the buffer volume when measuring in a conveying pipe with a process pressure of 0.65 Mpa, a temperature of 200° C. and a gas velocity of 30 m/s; maximum disturbance is a pressure shock of 0.03 MPa/s. The impulse conduit has a length of 4 meters and an inside diameter of 1.5 mm. The buffer volume is purged with clean process air of a pressure of 1.25 MPa and a temperature of 300° C. which is supplied in a conduit with an inside diameter of 0.5 mm.
I. The purging flow is $3.0 \times 10^{-4}$ kg/s.
II. With the criterium that the outflow velocity is to be 4–10 m/s, the hole diameter of the measuring outlet may be set at 3.2 mm, which results in an outflow velocity of 9.5 m/s.
III. The pressure drop across the measuring outlet is 503 Pa.
IV. The volume of the impulse conduit is $7.1 \times 10^{-6}$ m$^3$.
V. Maximum disturbance gives a disturbance flow in through the measuring outlet of $2.6 \times 10^{-3}$ kg/s.
VI. Assuming that $k=1$, the buffer volume is $6.1 \times 10^{-5}$ m$^3$, which with a diameter of 20 mm gives a length of 194 mm.
$k=1$ and an inside diameter of the buffer volume of 20 mm result in the cross section area ratio between the buffer volume and the impulse conduit being $400/2.25=178$; the ratio between the cross section area of the buffer volume and the hole area of the measuring outlet being $400/10.2=39$; and the ratio between the hole area of the measuring outlet and the cross section area of the impulse conduit being $10/2.2=4.6$.

EXAMPLE 3

Dimensioning of the buffer volume when measuring in a fluidized bed with a process pressure of 1.21 MPa, a temperature of 860° C.; maximum disturbance is a pressure shock of 200 Pa/s. The impulse conduit has a length of 18 meters and an inside diameter of 8 mm. The buffer volume is purged with clean process air of a pressure of 1.25 MPa and a temperature of 300° C. which is supplied in a conduit with an inside diameter of 1.5.
I. The purging flow is $8.0 \times 10^{-4}$ kg/s.
II. With the criterium that the outflow velocity is to be 4–10 m/s, the hole diameter of the measuring outlet may be set at 5 mm, which results in an outflow velocity of 5.6 m/s.
III. The pressure drop across the measuring outlet is 311 Pa.
IV. The volume of the impulse conduit is $9 \times 10^{-4}$ m$^3$.
V. Maximum disturbance gives a disturbance flow in through the measuring outlet of $4.7 \times 10^{-4}$ kg/s.
VI. Assuming that $k=0.8$, the buffer volume is $4.2 \times 10^{-4}$ m$^3$, which with a diameter of 50 mm gives a length of 214 mm.
$k=0.8$ and an inside diameter of the buffer volume of 50 mm result in the cross section area ratio between the buffer volume and the impulse being $2500/64=39$; the ratio between the cross section area of the buffer volume and the hole area of the measuring outlet being $2500/25=100$; and the ratio between the hole area of the measuring outlet and the cross section area of the impulse conduit being $25/64=0.4$.

I claim:
1. Apparatus for measuring the pressure within a fluid-conveying member of a mixture of a fluid and particulate solids comprising:
an outlet port in said fluid-conveying member;
a buffer vessel having walls defining a buffer volume for containing a buffer medium, said buffer vessel having first and second end portions, and having a measuring outlet at said first end portion being in fluid communication with said outlet port of said fluid-conveying member;
an impulse conduit having first and second ends, said first end being in fluid communication with said second end portion of said buffer vessel;
a fluid pressure measuring device in fluid communication with said second end of said impulse conduit;

a source of purging medium in fluid communication with said second end portion of said buffer vessel; and, means for controlling the flow of said purging medium to establish a back pressure in said buffer vessel sufficient to prevent particulate solids which flow into the buffer vessel from the fluid-conveying member from reaching said impulse conduit.

2. Apparatus according to claim 1 wherein said buffer volume is established according to the equation $$\frac{\text{Buffer volume}}{\text{impulse conduit volume}} = K \frac{\text{disturbance flow rate}}{\text{purging flow rate}}$$

where K is a dimensionless factor having a value from about 0.1 to about 1.

3. Apparatus according to claim 2 wherein K has a value from about 0.6 and 1.

4. Apparatus according to claim 1 wherein said buffer volume is designed to permit use of a small and essentially constant purge medium flow.

5. Apparatus according to claim 1 further comprising a baffle positioned in the buffer vessel such that the measuring outlet is located at one side of the baffle and a purging medium supply conduit and the impulse conduit at the other side of the baffle.

6. Apparatus according to claim 1 wherein the source of purging medium is provided for supplying the buffer volume with clean pressure medium, of a higher pressure than that of the pressure medium located in the fluid-conveying member and, during steady state or pressure reduction, purges the buffer vessel and the measuring outlet form solid material.

7. Apparatus according to claim 1 wherein a pressure source provided to supply the fluid-conveying member with a pressure medium to fluidize solid material also supplies the buffer vessel with the purging medium of a higher pressure than that of the pressure medium located in the fluid-conveying member near the measuring outlet and, during steady state or pressure reduction purges the buffer vessel and the measuring outlet from solid material.

8. Apparatus according to claim 1 wherein the fluid-conveying member is a pipe for gaseous or liquid transport of solid material such as a conveying pipe for the supply of crushed particulate fuel or bed material to a plant with combustion in a fluidized bed, or a conveying pipe for the discharge of ashes from the same plant.

9. Apparatus according to claim 1 wherein the fluid-conveying member is a bed vessel in a plant with a fluidized bed, especially a plant with combustion in a fluidized bed, a so-called PRBC plant.

* * * * *